US009937656B2

(12) United States Patent
Halla et al.

(10) Patent No.: US 9,937,656 B2
(45) Date of Patent: Apr. 10, 2018

(54) METHOD FOR PRINTING COMPONENT WITH ANTI-COUNTERFEIT FEATURES

(71) Applicant: Caterpillar Inc., Peoria, IL (US)

(72) Inventors: Eric Edward Halla, Peoria, IL (US); Ryan William Van Deest, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/204,154

(22) Filed: Jul. 7, 2016

(65) Prior Publication Data

US 2018/0009159 A1  Jan. 11, 2018

(51) Int. Cl.

| | |
|---|---|
| *B32B 3/00* | (2006.01) |
| *B29C 64/106* | (2017.01) |
| *B41M 5/00* | (2006.01) |
| *B29C 47/06* | (2006.01) |
| *B29C 64/386* | (2017.01) |
| *B33Y 10/00* | (2015.01) |
| *B33Y 50/00* | (2015.01) |
| *B33Y 80/00* | (2015.01) |
| *B29L 9/00* | (2006.01) |

(52) U.S. Cl.
CPC ............ *B29C 64/106* (2017.08); *B29C 47/06* (2013.01); *B29C 64/386* (2017.08); *B41M 5/0082* (2013.01); *B29L 2009/00* (2013.01); *B33Y 10/00* (2014.12); *B33Y 50/00* (2014.12); *B33Y 80/00* (2014.12)

(58) Field of Classification Search
CPC .. B29C 37/0025; B29L 2009/00; B41M 3/00; B41M 3/14
See application file for complete search history.

(56) References Cited

U.S. PATENT DOCUMENTS

| | | |
|---|---|---|
| 6,456,726 B1 | 9/2002 | Yu et al. |
| 6,823,075 B2 | 11/2004 | Perry |
| 7,039,214 B2 | 5/2006 | Miller et al. |
| 7,173,515 B2 | 2/2007 | Ohki et al. |
| 7,366,301 B2 | 4/2008 | Huang et al. |
| 8,345,316 B2 | 1/2013 | Bradley et al. |
| 9,374,497 B2 | 6/2016 | Misfeldt et al. |
| 2014/0052287 A1 | 2/2014 | Swanson et al. |
| 2014/0058959 A1 | 2/2014 | Isbjornssund et al. |
| 2015/0170013 A1 | 6/2015 | Wilson et al. |
| 2015/0375455 A1 | 12/2015 | Williams et al. |
| 2016/0229120 A1* | 8/2016 | Levine ............... B29C 67/0085 |

* cited by examiner

*Primary Examiner* — Elizabeth E Mulvaney
(74) *Attorney, Agent, or Firm* — Finnegan, Henderson, Farabow, Garrett & Dunner, LLP; Edward Lin

(57) ABSTRACT

An additively manufactured component has a plurality of overlapping layers bonded to each other. The plurality of overlapping layers includes at least a first subset of layers, and at least one layer of the at least a first subset of layers includes adjacent tracks bonded to each other. At least one of the adjacent tracks has a tool path pattern that is encoded with information.

20 Claims, 3 Drawing Sheets

METHOD FOR PRINTING COMPONENT WITH ANTI-COUNTERFEIT FEATURES

TECHNICAL FIELD

The present disclosure relates generally a printing method and a resulting component, and more particularly, to a method for printing the component to have anti-counterfeit features.

BACKGROUND

Additive manufacturing is a process of creating three-dimensional components by depositing overlapping layers of material under the guided control of a computer. One technique of additive manufacturing is known as material extrusion. Using the material extrusion technique, a matrix material (e.g., a heated and/or pressurized thermoplastic) is extruded through a print head. The print head is moved in a predefined trajectory (a.k.a., a tool path) as the matrix material discharges from the print head, such that the matrix material is laid down in a particular pattern and shape of overlapping layers. The matrix material, after exiting the print head, hardens into a final form.

Although the material extrusion technique and other techniques of additive manufacturing can be efficient ways to produce high-performance and geometrically complex original components, similar looking copies of the component can be easily produced using commercially available printers. In particular, the original components can be scanned to generate data files that represent external features of the original components. These data files can then be fed into the commercially available printers and used to produce copies that appear to be identical to the original components. In some instances, the copies may even be marked, packaged, and/or sold as original components.

The copies, while they may appear identical, may not have identical internal structure or materials or be produced in a manner identical to that (e.g., using an identical tool path) used to produce the original components. As result, the copies may not perform as well as the original components. In addition, the copies may be produced illegally (e.g., without licensed authority from the manufacturer) and, because the copies may appear to be identical to and are sold as the original components, customers may unknowingly purchase the copies in place of the original components. The illegal production and sale of copied components can undercut the market of original components. And when the copies fail prematurely, the customers may attempt to receive undue warranty relief. In some situations, it may be difficult for the manufacture to determine if a failed component is an original or a copy.

Historically, printed components have been fabricated to include hidden anti-counterfeit features that can be used to determine if a given component is an original or a copy. In particular, information about the component was printed onto an intermediate layer inside the part. The information included, for example, a manufacturer's name or logo, an alpha-numeric part number, or other information. Then, when the authenticity of a given component was questioned, that component could be cut open at the intermediate layer to see if the anti-counterfeit features were included.

While the traditional approach to preventing counterfeit printing of components may be somewhat successful, it can also be problematic. In particular, it may be difficult to determine where the part should be cut open to find the corresponding anti-counterfeit features. In addition, the anti-counterfeit features can interrupt a continuous structure of the component, creating weak points in the component. Similarly, voids created in and around these features e.g., between letters, numbers, and/or images) may create weak points in the component. Finally, some traditional anti-counterfeit features may, themselves, be easy to copy once their existence within the component is determined.

The disclosed method and component are directed to overcoming one or more of the problems set forth above and/or other problems of the prior art,

SUMMARY

In one aspect, the present disclosure is directed to an additively manufactured component. The additively manufactured component may include a plurality of overlapping layers bonded to each other. The plurality of overlapping layers may include at least a first subset of layers, and at least one layer of the at least a first subset of layers includes adjacent tracks bonded to each other. At least one of the adjacent tracks has a tool path pattern that is encoded with information.

In another aspect, the present disclosure is directed to a computer-readable storage medium having data stored thereon representing a three-dimensional model suitable for additively manufacturing a component. The component may include a plurality of overlapping layers bonded to each other. The plurality of overlapping layers includes at least a first subset of layers, and at least one layer of the at least a first subset of layers includes adjacent tracks bonded to each other. At least one of the adjacent tracks has a tool path pattern that is encoded with information In yet another aspect, the present disclosure is directed to a method of additively manufacturing a component. The method may include providing a computer-readable three-dimensional model of the component. The three-dimensional model may be configured to be converted into a plurality of slices that define a plurality of overlapping layers of the component. The method may also include successively forming each of the plurality of overlapping layers of the component by additive manufacturing. The plurality of overlapping layers includes at least a first subset of layers, and at least one layer of the at least a first subset of layers includes adjacent tracks bonded to each other. At least one of the adjacent tracks has a tool path pattern that is encoded with information.

DETAILED DESCRIPTION

Figure 1:
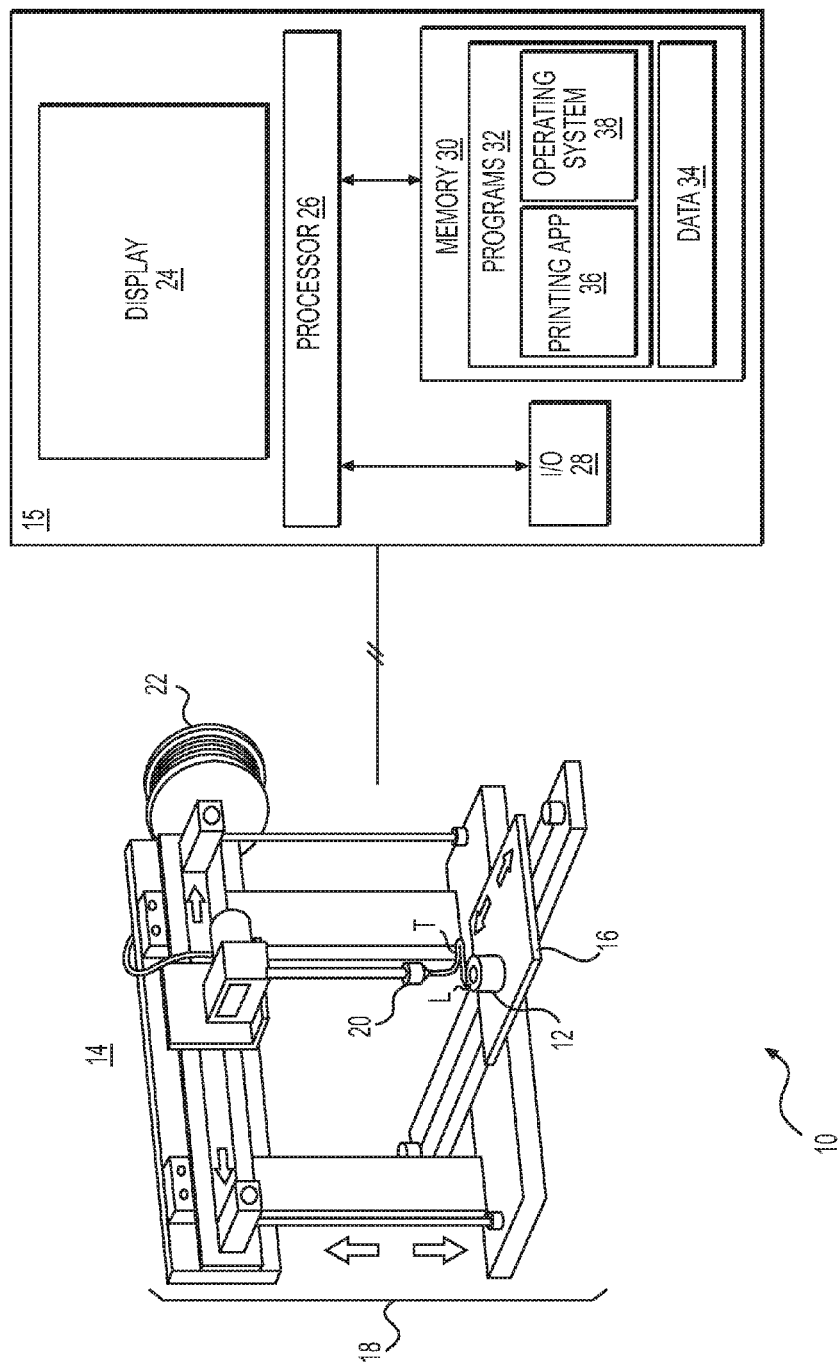
FIG. 1 is diagrammatic illustration of an exemplary disclosed system for manufacturing a component.

FIG. 1 illustrates an exemplary system 10, which may be used to fabricate an exemplary component 12 having any desired shape, size, and structure. System 10 may include, among other things, a printer 14 and at least one computing device 15 coupled with printer 14. Printer 14 may be configured to create component 12 under the guided control of computing device 15, for example by way of an additive manufacturing process. Although a material extrusion technique will be described below as one example of how component 12 may be created, it should be noted that other techniques known in the art could alternatively be utilized for this purpose.

Printer 14 may be comprised of components that are controlled to create component 12 layer-by-layer using material extrusion technology. Specifically, printer 14 may include a support 16, a drive 18, and one or more heads 20. Each head 20 may be coupled to support 16 via drive 18. In the disclosed embodiment of FIG. 1, drive 18 is an overhead gantry capable of moving head 20 in multiple directions during fabrication of component 12. Although drive 18 is shown as being capable of 3-axis movement, it is contemplated that any other type of drive 18 (e.g., a robotic arm, an arm/gantry combination, etc.) capable of moving head 20 in the same or a different manner could also be utilized, if desired.

Each head 20 (only one shown in FIG. 1, for clarity) may be configured to discharge at least a matrix material (e.g., a resin, a polymer, concrete, a metal slurry, etc.). In some embodiments, the matrix material may be mixed with, contain, or otherwise coat one or more reinforcements (e.g., continuous or chopped fibers, such as carbon fibers, glass fibers, metallic fibers, etc.). In these embodiments, the matrix material and the fiber(s) may be supplied to head 20 from a common source 22 (e.g., as a fiber core coated with a solid thermoplastic sleeve). In other embodiments, the matrix material and fiber(s) are provided separately. The matrix material may be supplied in a solid, plastic, or liquid state, and head 20 may be capable of liquefying (e.g., melting) the matrix material in some embodiments. The fiber(s), if included, may be coated with the matrix material before and/or while passing through head 20. As matrix only or matrix-coated reinforcements(s) discharge from head 20, the matrix material may harden.

Drive 18 may move head 20 in a particular trajectory (e.g., a trajectory corresponding to an intended shape and size of component 12) at the same that the matrix or matrix-coated fiber(s) discharge from head 20, such that continuous tracks T of material are formed along the trajectory. These tracks T of material can be laid adjacent and/or on top of each other while the matrix is still in a liquid or semi-liquid state. The adjacent tracks T of material deposited within a common plane may form a connected layer L, and overlapping layers L are built up to form component 12. As the material subsequently hardens, adjacent tracks T and overlapping layers L may bond to each other.

Any number of separate computing devices 15 may be used to control the trajectory of head 20 during formation of component 12. Computing device 15 may include a display 24, one or more processors 26, any number of input/output ("I/O") devices 28, and one or more memories 30 for storing programs 32 and data 34. Programs 32 may include, for example, any number and type of printing apps 36 and an operating system 38.

Display 24 of computing device 15 may include a liquid crystal display (LCD), a light emitting diode (LED) screen, an organic light emitting diode (OLED) screen, and/or another known display device. Display 24 may be used for display of data under the control of processor 26.

Processor 26 may be a single or multi-core processor configured with virtual processing technologies, and use logic to simultaneously execute and control any number of operations. Processor 26 may be configured to implement virtual machine or other known technologies to execute, control, run, manipulate, and store any number of software modules, applications, programs, etc. In addition, in some embodiments, processor 26 may include one or more specialized hardware, software, and/or firmware modules (not shown) specially configured with particular circuitry, instructions, algorithms, and/or data to perform functions of the disclosed methods. It is appreciated that other types of processor arrangements could be implemented that provide for the capabilities disclosed herein.

Memory 30 can be a volatile or non-volatile, magnetic, semiconductor, tape, optical, removable, non-removable, or other type of storage device or tangible and/or non-transitory computer-readable medium that stores one or more executable programs 32, such as printing apps 36 and operating system 38. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, and EPROM, a FLASH-EPROM or other flash memory, NVRAM, a cache, a register or other memory chip or cartridge, and networked versions of the same.

Memory 30 may store instructions that enable processor 26 to execute one or more applications, such as printing apps 36, operating system 38, and any other type of application or software known to be available on computer systems. Alternatively or additionally, the instructions, application programs, etc. can be stored in an internal and/or external database (e.g., a cloud storage system—not shown) that is in direct communication with computing device 15, such as one or more databases or memories accessible via one or more networks (not shown). Memory 30 can include one or more memory devices that store data and instructions used to perform one or more features of the disclosed embodiments. Memory 30 can also include any combination of one or more databases controlled by memory controller devices (e.g., servers, etc.) or software, such as document management systems, Microsoft SQL databases, SharePoint databases, Oracle™ databases, Sybase™ databases, or other relational databases.

In some embodiments, computing device 15 is communicatively connected to one or more remote memory devices (e.g., remote databases—not shown) through a network. The remote memory devices can be configured to store information that computing device 15 can access and/or manage. By way of example, the remote memory devices could be document management systems, Microsoft SQL database, SharePoint databases, Oracle™ databases, Sybase™ databases, Cassandra, HBase, or other relational or non-relational databases or regular files. Systems and methods consistent with disclosed embodiments, however, are not limited to separate databases or even to the use of a database.

Programs 32 may include one or more software or firmware modules causing processor 26 to perform one or more functions of the disclosed embodiments. Moreover, processor 26 can execute one or more programs located remotely from computing device 15. For example, computing device 15 can access one or more remote programs that, when executed, perform functions related to disclosed embodiments. In some embodiments, programs 32 stored in memory 30 and executed by processor 26 can include one or more of printing apps 36 and operating system 38. Printing apps 36 may cause processor 26 to perform one or more functions of the disclosed methods.

Operating system 38 may perform known operating system functions when executed by one or more processors such as processor 26. By way of example, operating system 38 may include Microsoft Windows™, Unix™, Linux™, Apple™ operating systems, Android™ operating systems, or another type of operating system 38. Accordingly, disclosed embodiments can operate and function with computer systems running any type of operating system 38.

I/O devices 28 may include one or more interfaces for receiving signals or input from a user and/or printer 14, and for providing signals or output to printer 14 that allow component 12 to be printed. For example, computing device 15 can include interface components for interfacing with one or more input devices, such as one or more keyboards, mouse devices, and the like, which enable computing device 15 to receive input from a user (not shown).

Figure 3:
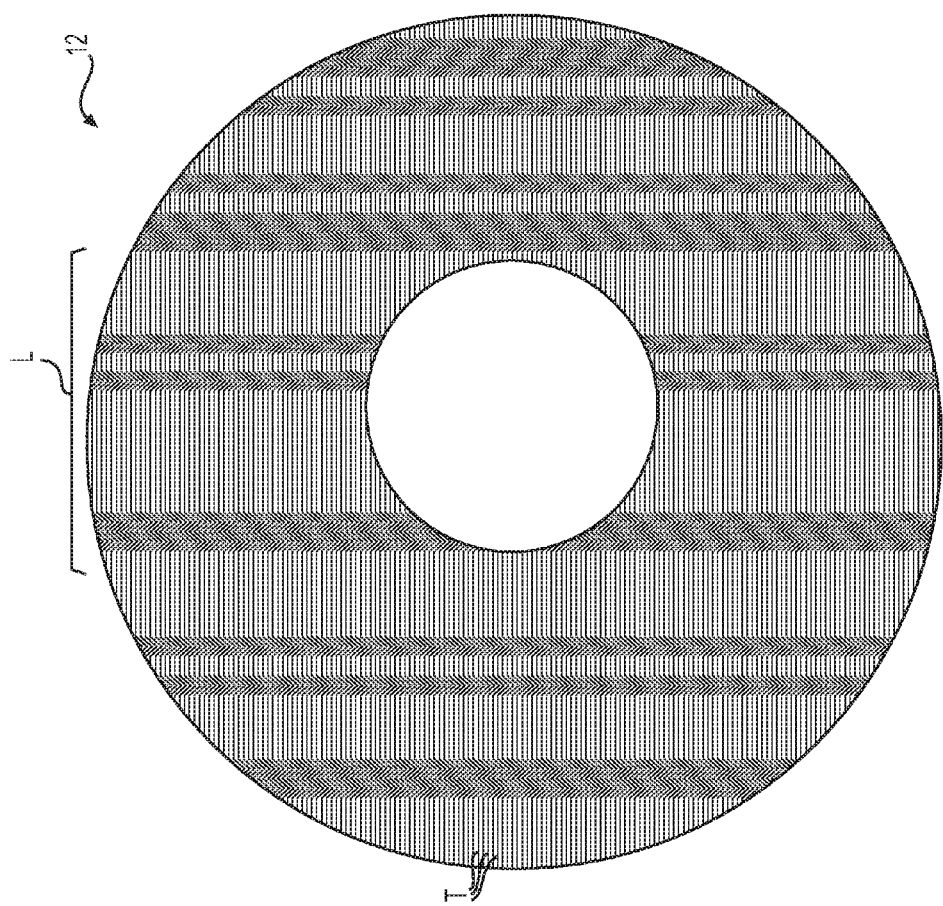
FIG. 3 is a cross-sectional illustration of an exemplary disclosed layer of the component of FIG. 2.
Figure 2:
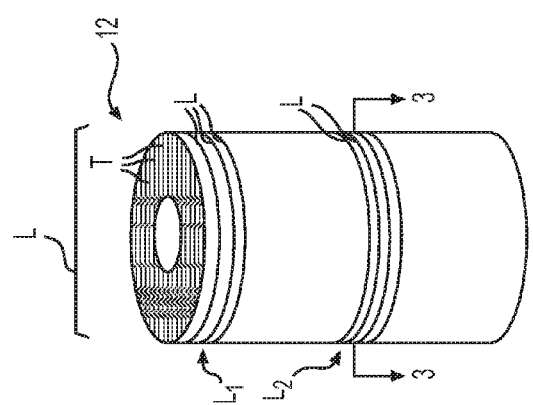
FIG. 2 is a perspective illustration of an exemplary disclosed component that may be manufactured by the system of FIG. 1.

FIGS. 2 and 3 illustrate a simplified representation of an exemplary component 12. Although component 12 is shown in these figures as being generally cylindrical and hollow, it should be noted that other shapes, sizes, configurations, and complexities are contemplated. Component 12 may be fabricated from any number of overlapping layers L, each made up of any number of adjacent tracks T. Tracks T may have any cross-sectional shape, size, and length. In addition, each track T may be disjointed from adjacent tracks at ends thereof, or continuous. In particular, each track T could be fabricated by starting and stopping the discharge of material from head 20 (referring to FIG. 1) at an edge of component 12, or fabricated by reversing tool path direction (e.g., at a laterally spaced location) without a stopping of material discharge from head 20. Alternatively, each track T could be generated by material simultaneously discharging from different openings of the same head 20 or from different heads 20.

As shown in FIG. 2, component 12 may include different subsets of layers L. For example, component 12 could include a first subset $L_1$ and a second subset $L_2$. In this example, first subset $L_1$ is located at an end (e.g., a bottom or a top relative to the axial direction shown in FIG. 2) of component 12, while second subset $L_2$ is an internal subset (e.g., a subset bordered in at least two opposing directions by other subsets) of layers L.

One or more layers L of one or more layer subsets $L_1$ or $L_2$ of component 12 may have a tool path pattern of track contours that functions as an anti-counterfeiting feature. In particular, it may be possible to create a particular layer L of component 12 using tracks T having any particular contour. Traditional approaches would normally specify that the tracks of every layer should have a straight contour or contours that match feature shapes of the corresponding component, as such contours are generally quicker and easier to fabricate. For example, a conventional printer head would normally be controlled to move in a single direction during material discharge, such that a centerline axis of each resulting track would be straight, in another example, the conventional print head would be controlled to follow the general inner or outer shape (e.g., a curved shape) of the component. In the disclosed embodiment, however, the contour of one or more tracks T within a particular layer L may be selectively varied (e.g., shifted in the plane of the layer L) to match a specified tool path pattern that corresponds with encoded information about component 12. In the disclosed embodiment, all tracks T within a particular layer L have the same tool path pattern, such that the tool path pattern is repeated across the cross-section of component 12. In addition, multiple layers L (e.g., all layers within a particular subset of overlapping layers L) of component 12 may have identical track patterns.

It is contemplated that different layer subsets (e.g., subsets $L_1$ and $L_2$) could have the same or different tool path patterns, as desired. In particular, it may be possible for subset $L_1$ to have a first tool path pattern that is meant to be visible on the outside of component 12, while subset $L_2$ may have a second tool path pattern that is only internally visible (e.g., visible via CT scanning, x-raying, or cutting). In this situation, the visible tool path pattern (i.e., the tool path pattern of subset $L_1$) may be used for identification purposes, while the hidden tool path pattern (i.e., the tool path pattern of subset $L_2$) may be used for anti-counterfeiting purposes.

An exemplary tool path pattern is illustrated in the component embodiment of FIG. 3. As can be seen in this figure, the tool path pattern may include a series of peaks, nested peaks, troughs, nested troughs, flat portions, plateaus, valleys, etc. It should be noted that the disclosed tool path pattern is designed to reduce or eliminate voids between adjacent tracks T that could function as stress-risers within component 12. And as described above, the tool path pattern may be repeated across the cross-section of component 12. Repetition of the tool path pattern across the cross-section may allow the pattern to be easily identified, even if part of the cross-section was damaged or missing. Multiple layers having the same tool path pattern may provide similar functionality, while also allowing for less accurate cutting away of component 12 to still reveal a complete tool path pattern. In addition, the identical layers may enhance a strength of component 12 in a direction normal to a layer plane.

Figure 5:
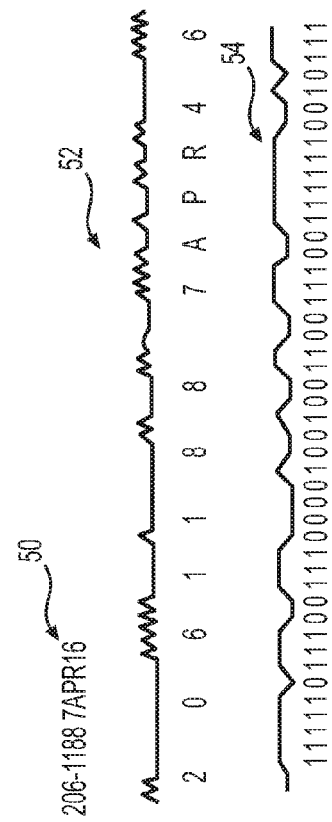
FIG. 5 is diagrammatic illustration of exemplary coded messages that may be incorporated into the component of FIG. 2 by the system of FIG. 1.
Figure 4:
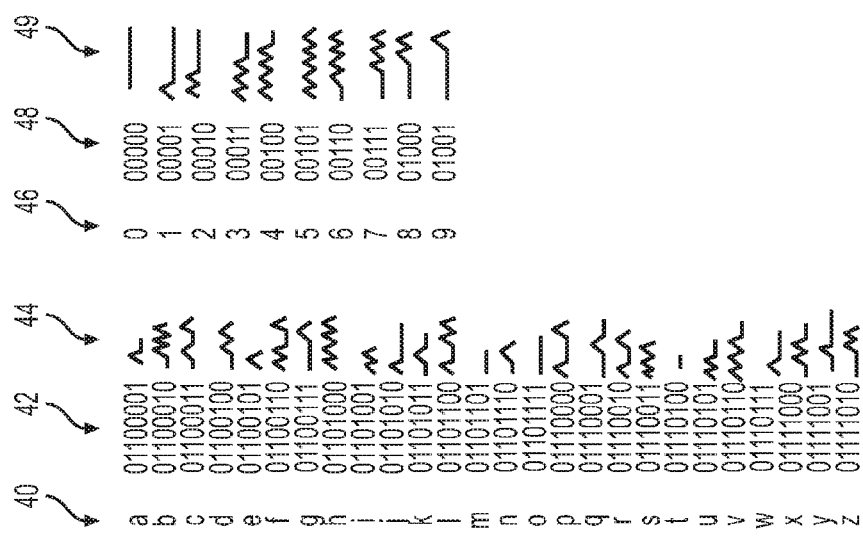
FIG. 4 is a table illustrating exemplary disclosed coded relationships that may be utilized by the system of FIG. 1 during manufacture of the component of FIG. 2.

FIGS. 4 and 5 illustrate exemplary codes that may be used to embed information within the tool path patterns of track contours in component 12. In a first exemplary table shown in FIG. 4, the English-language alphabet is provided in a first column 40, corresponding binary code is provided in a second column 42, and a corresponding unique geometric code is provided in a third column 44. Similarly, numbers 1-9 are provided in a fourth column 46, corresponding binary code is provided in a fifth column 48, and the corresponding unique geometric code is provided in a sixth column 49. As can be seen from the table of FIG. 4, the unique geometric code may consist of a series of spaced-apart peaks interspersed with nested peaks and/or straight sections (e.g., flat horizontal lines) that are connected to bases of the peaks. Using the table of FIG. 4, nearly any message may be created by referencing letters, numbers, and/or binary code to determine the corresponding series of peaks and flat horizontal lines that should be used in the message. The peaks and flat horizontal lines can be joined end-to-end within the contour of a specific track T to create a complete message of imbedded information.

Any type of information may be imbedded within the encoded track contour. For example, the information may include a part number, a serial number, a manufacturer, a manufacturing facility code, a batch number, a manufacture date, or any other information known in the art. For example, subset $L_1$, if visible from outside of component 12, may include information that is primarily useful to a customer, such as the part number. In this same example, subset $L_2$, if hidden within component 12, may include information that is primarily useful to the manufacturer, such as a serial number, the manufacturer's name, the manufacturing facility code, the batch number, the manufacture date, or other information that could be used to determine the authenticity of component 12.

FIG. 5 illustrates an exemplary message 50, which could be encoded into any one or more tracks T of component 12 on any one or more layers L using an exemplary tool path pattern 52. In this example, message 50 includes a part number (206-1188) and a manufacture date (7 Apr. 2016), and tool path pattern 52 was determined by referencing the part number and manufacture date with the table of FIG. 4.

Binary code, as is known in the art, includes a series of "1's" and "0's" to represent letters and numbers. The "1's" and "0's" of the binary code can be plotted on a line graph to provide a graphical representation of the letters and numbers. In one embodiment, plotting of the binary code can be used as alternative way to generate the disclosed encoded tool path pattern within the tracks T of component 12. Such an exemplary tool path pattern 54 is also shown in FIG. 5 to represent the same exemplary message 50 encoded within the exemplary tool path pattern 52. It is contemplated that other ways to encode a message and generate a corresponding tool path pattern within the track contours of component 12 may be utilized, if desired.

INDUSTRIAL APPLICABILITY

The disclosed system may be used to manufacture high-performance components (e.g., components of any shape, size, and complexity that include or do not include reinforcing elements) that are difficult to counterfeit. The disclosed system may make counterfeiting difficult, by embedding coded messages within the contours of tracks that make up one or more layers of the components. The coded messages may be completely hidden, externally visible, or include a combination of hidden and visible contours.

The embedded messages may allow for simple counterfeit detection. In particular, counterfeit detection may be simplified because the authenticity of a given component may be confirmed merely by viewing a cross-section (e.g., any cross-section or only certain cross-sections) of the component. In one example, a visible end of a particular component may contain encoded information that allows for counterfeit detection without having to scan, x-ray, or cut the component apart. In another example, the component may alternatively or additionally contain hidden information (e.g., internal information that a potential counterfeiter would not be aware of), which can only be viewed and/or interpreted by an authorized and knowledgeable individual. In this example, the component may be scanned, x-rayed, and/or cut through at any layer and without requiring great precision in the process, or only scan, x-ray, and/or cut through at a particular subset of layers a subset known only to the authorized individual). In addition, only the authorized individual may be provided with a reference table that can be used to interpret the track contours (i.e., the tool path pattern of particular tracks) and, thereby, decipher the hidden and encoded information. Damaged components (e.g., even broken components and/or components missing portions, for which a warranty claims has been made) may still have their authenticity confirmed in this manner, because the encoded information may be repeated throughout the cross-section and/or within multiple layers.

The disclosed components, while including visible and/or hidden messages, may still maintain their integrity. In particular, because encoding the information may not introduce voids into the component, the component may avoid the formation of stress-risers or weak spots, and thereby remain strong.

It will be apparent to those skilled in the art that various modifications and variations can be made to the disclosed system and component. Other embodiments will be apparent to those skilled in the art from consideration of the specification and practice of the disclosed system and component. It is intended that the specification and examples be considered as exemplary only, with a true scope being indicated by the following claims and their equivalents.

What is claimed is:

1. An additively manufactured component, comprising a plurality of overlapping layers bonded to each other, wherein:
   the plurality of overlapping layers includes at least a first subset of layers;
   at least one layer of the at least a first subset of layers includes adjacent tracks bonded to each other; and
   at least one of the adjacent tracks has a tool path pattern that is encoded with information.

2. The additively manufactured component of claim 1, wherein all of the adjacent tracks within a common layer have the tool path pattern that is encoded with information.

3. The additively manufactured component of claim 2, wherein each of the at least a first subset of layers includes adjacent tracks having the tool path pattern encoded with information.

4. The additively manufactured component of claim 3, wherein:
   the at least a first subset of overlapping layers includes a first subset of overlapping layers and a second subset of overlapping layers;
   the at least a first subset of overlapping layers includes adjacent tracks having a first tool path pattern encoded with information; and
   the at least a second subset of overlapping layers includes adjacent tracks having a second tool path pattern encoded with different information.

5. The additively manufactured component of claim 4, wherein only the first tool path pattern is visible from an exterior of the additively manufactured component.

6. The additively manufactured component of claim 5, wherein:
   the first tool path pattern is encoded with a part number of the additively manufactured component; and
   the second tool path pattern is encoded with at least one of a serial number, a manufacturer's name, a facility code, and a manufacture date.

7. The additively manufactured component of claim 5, wherein the second tool path pattern is visible only when the additively manufactured component is scanned, x-rayed, or cut open.

8. The additively manufactured component of claim 2, wherein the adjacent tracks of the common layer having the tool path pattern are formed without voids therebetween.

9. The additively manufactured component of claim 1, wherein the tool path pattern includes a series of spaced-apart peaks interspersed with at least one of nested peaks or straight portions that connected to bases of the spaced-apart peaks.

10. The additively manufactured component of claim 1, wherein the tool path pattern includes a graphical representation of binary code.

11. A computer-readable storage medium having data stored thereon representing a three-dimensional model suitable for additively manufacturing a component comprising a plurality of overlapping layers bonded to each other, wherein:
   the plurality of overlapping layers includes at least a first subset of layers;

at least one layer of the at least a first subset of layers includes adjacent tracks bonded to each other; and at least one of the adjacent tracks has a tool path pattern that is encoded with information.

12. The computer-readable storage medium of claim 11, wherein all of the adjacent tracks within a common layer have the tool path pattern that is encoded with information.

13. The computer-readable storage medium of claim 12, wherein each of the at least a first subset of layers includes adjacent tracks having the tool path pattern encoded with information.

14. The computer-readable storage medium of claim 13, wherein:

the at least a first subset of overlapping layers includes a first subset of overlapping layers and a second subset of overlapping layers;

the at least a first subset of overlapping layers includes adjacent tracks having a first tool path pattern encoded with information; and the at least a second subset of overlapping layers includes adjacent tracks having a second tool path pattern encoded with different information.

15. The computer-readable storage medium of claim 14, wherein only the first tool path pattern is visible from an exterior of the component.

16. The computer-readable storage medium of claim 15, wherein:

the first tool path pattern is encoded with a part number of the component; and the second tool path pattern is encoded with at least one of a serial number, a manufacturer's name, a facility code, and a manufacture date.

17. The computer-readable storage medium of claim 15, wherein the second tool path pattern is visible only when the component is scanned, x-rayed, or cut open.

18. A method for manufacturing a component, comprising:

providing a computer-readable three-dimensional model of the component, the computer-readable three-dimensional model being configured to be converted into a plurality of slices that define a plurality of overlapping layers of the component; and successively forming each of the plurality of overlapping layers of the component by additive manufacturing, wherein:

the plurality of overlapping layers includes at least a first subset of layers;

at least one layer of the at least a first subset of layers includes adjacent tracks bonded to each other; and at least one of the adjacent tracks has a tool path pattern that is encoded with information.

19. The method of claim 18, wherein all of the adjacent tracks within a common layer have the tool path pattern that is encoded with information.

20. The method of claim 19, wherein each of the at least a first subset of layers includes adjacent tracks having the tool path pattern encoded with information.

* * * * *